(12) United States Patent
Koran

(10) Patent No.: US 10,325,289 B2
(45) Date of Patent: Jun. 18, 2019

(54) USER SIMILARITY GROUPS FOR ON-LINE MARKETING

(71) Applicant: Amobee, Inc., Redwood City, CA (US)

(72) Inventor: Joshua M. Koran, Los Altos, CA (US)

(73) Assignee: Amobee, Inc., Redwood, CA (US)

( * ) Notice: Subject to any disclaimer, the term of this patent is extended or adjusted under 35 U.S.C. 154(b) by 342 days.

(21) Appl. No.: 15/213,336

(22) Filed: Jul. 18, 2016

(65) Prior Publication Data

US 2016/0328748 A1 Nov. 10, 2016

Related U.S. Application Data

(63) Continuation of application No. 14/248,085, filed on Apr. 8, 2014, now abandoned.

(51) Int. Cl.
*G06Q 30/02* (2012.01)

(52) U.S. Cl.
CPC ..... *G06Q 30/0269* (2013.01); *G06Q 30/0277* (2013.01)

(58) Field of Classification Search
CPC .... G06Q 30/00; G06Q 30/02; G06Q 30/0241; G06Q 30/0269
USPC .............. 705/14.66, 7.33; 707/706
See application file for complete search history.

(56) References Cited

U.S. PATENT DOCUMENTS

| | | | |
|---|---|---|---|
| 7,424,439 B1 * | 9/2008 | Fayyad | G06Q 30/0204 705/7.33 |
| 7,849,027 B2 | 12/2010 | Koran et al. | |
| 8,438,184 B1 | 5/2013 | Wang et al. | |
| 8,725,570 B2 | 5/2014 | Doughty et al. | |
| 8,782,034 B1 * | 7/2014 | Moczydlowski | G06F 17/30867 707/706 |
| 2006/0173744 A1 | 8/2006 | Kandasamy et al. | |
| 2010/0042421 A1 | 2/2010 | Bai et al. | |
| 2013/0124309 A1 | 5/2013 | Traasdahl et al. | |
| 2013/0124330 A1 * | 5/2013 | Doughty | G06Q 30/0269 705/14.66 |
| 2015/0235258 A1 | 8/2015 | Shah et al. | |
| 2015/0235275 A1 | 8/2015 | Shah et al. | |
| 2015/0287091 A1 | 10/2015 | Koran | |

OTHER PUBLICATIONS

"U.S. Appl. No. 14/248,085, Final Office Action dated Mar. 17, 2016", 35 pgs.

(Continued)

*Primary Examiner* — Marilyn G Macasiano
(74) *Attorney, Agent, or Firm* — Kwan & Olynick LLP

(57) ABSTRACT

Methods and apparatus for finding similar on-line users for advertisement or content targeting are disclosed. In one embodiment, a plurality of user data sets associated with a plurality of user identifiers for a plurality of anonymous users are obtained, and each user data set of each user identifier specifies one or more user attributes and on-line user events that have occurred for such user identifier. For each attribute, a correlation to a success metric value is determined for a particular type of event or attribute that has occurred for a plurality of user identifiers that are each associated with such attribute. The plurality of user identifiers and associated data sets are clustered into a plurality of user groups that each has similar data sets by weighting based on the attributes' relative correlation to the success metric.

25 Claims, 10 Drawing Sheets

(56) References Cited

OTHER PUBLICATIONS

"U.S. Appl. No. 14/185,092, Advisory Action dated Mar. 10, 2015", 3 pgs.
"U.S. Appl. No. 14/185,092, Advisory Action dated Dec. 1, 2014", 3 pgs.
"U.S. Appl. No. 14/185,092, Examiner Interview Summary dated Mar. 10, 2015", 2 pgs.
"U.S. Appl. No. 14/185,092, Examiner Interview Summary dated Jul. 28, 2014", 3 pgs.
"U.S. Appl. No. 14/185,092, Examiner Interview Summary dated Aug. 19, 2015", 3 pgs.
"U.S. Appl. No. 14/185,092, Final Office action dated Sep. 11, 2014", 28 pgs.
"U.S. Appl. No. 14/185,092, Final Office Action dated Oct. 27, 2015", 36 pgs.
"U.S. Appl. No. 14/185,092, Non Final Office Action dated Apr. 22, 2014", 34 pgs.
"U.S. Appl. No. 14/185,092, Non Final Office Action dated Jul. 2, 2015", 33 pgs.
"U.S. Appl. No. 14/185,118, Advisory Action dated Mar. 12, 2015", 3 pgs.
"U.S. Appl. No. 14/185,118, Advisory Action dated Dec. 2, 2014", 3 pgs.
"U.S. Appl. No. 14/185,118, Examiner Interview Summary dated Mar. 12, 2015", 2 pgs.
"U.S. Appl. No. 14/185,118, Examiner Interview Summary dated Jul. 31, 2014", 3 pgs.
"U.S. Appl. No. 14/185,118, Examiner Interview Summary dated Aug. 19, 2015", 3 pgs.
"U.S. Appl. No. 14/185,118, Examiner Interview Summary dated Oct. 21, 2015", 3 pgs.
"U.S. Appl. No. 14/185,118, Final Office Action dated Sep. 12, 2014", 21 pgs.
"U.S. Appl. No. 14/185,118, Final Office Action dated Dec. 4, 2015", 33 pgs.
"U.S. Appl. No. 14/185,118, Non Final Office Action dated Apr. 24, 2014", 33 pgs.
"U.S. Appl. No. 14/185,118, Non Final Office Action dated Jul. 10, 2015", 27 pgs.
"U.S. Appl. No. 14/248,085, Examiner Interview Summary dated Oct. 10. 2014", 3 pgs.
"U.S. Appl. No. 14/248,085, Non Final Office Action dated Jun. 13, 2014", 14 pgs.
"U.S. Appl. No. 14/248,085, Non Final Office Action dated Jun. 23, 2015", 28 pgs.
"U.S. Appl. No. 14/248,085, Non Final Office Action dated Dec. 23, 2014", 20 pgs.
Locality-sensitive hashing, Wkipedia, Retrieved from the Internet: <http://en.wikipedia.org/wiki/Locality-sensitive_hashing>, Accessed on Jul. 10, 2014, 8 pgs.
Xu, Jin H. et al., "Web User Clustering Analysis based on KMeans Algorithm", ICINA, 2010, V2-6-V2-9.

\* cited by examiner

| User ID | Attributes | Events | Click Cnt | Conversion Cnt |
|---|---|---|---|---|
| U1 | A1, A2, A3 | ts1: I1, ts2: I2, ts3:C | 4 | 1 |
| U2 | A2 | ts4: I2 | 2 | 0 |
| U3 | A4, A5 | - | - | 1 |
| U4 | A6 | ts5:C | 1 | 1 |
| U5 | A1, A3, A4 | ts6: I3, ts7:A | 10 | 5 |

*Figure 5A*

| Attribute | Total User Count | Total Imp. Count | Total Click Count | Total Conversion Count |
|---|---|---|---|---|
| A1 | 3,010,001 | 1000 | 500 | 5 |
| A2 | 15,000 | 1000 | 5 | 1 |
| A3 | 1,000,122 | 1000 | 102 | 5 |
| A4 | 25 | 1000 | 0 | 0 |
| A5 | 10 | 1000 | 1 | 0 |

*Figure 5B*

USER SIMILARITY GROUPS FOR ON-LINE MARKETING

CROSS-REFERENCE TO RELATED APPLICATIONS

This application is a continuation of and claims benefit under 35 U.S.C. § 120 to U.S. application Ser. No. 14/248,085, filed 8 Apr. 2014 by Joshua M. Koran, which is herein incorporated by reference for all purposes.

TECHNICAL FIELD OF THE INVENTION

The present invention relates to on-line advertising and marketing, and more specifically to tracking user behavior and the like.

BACKGROUND

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness of their organizations by delivery of media to a target group of people.

Marketing campaigns are often set up with a goal to increase brand awareness by exposing particular users to particular marketing media through publisher sites. For instance, users may become aware of a particular brand of pickles after repeatedly being exposed to a particular advertisement campaign's advertisement. Additionally, marketing campaigns are often directed towards a particular audience segment whose users are most likely to purchase or use the particular product or service that is being marketed. In general, marketing campaigns seek to have a particular number or target range of exposures to certain targeted people.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for finding similar on-line users for advertisement or content targeting. In one embodiment, a plurality of user data sets associated with a plurality of user identifiers for a plurality of anonymous users are obtained, and each user data set of each user identifier specifies one or more user attributes and on-line user events that have occurred for such user identifier. For each attribute, a correlation to a success metric value is determined for a particular attribute (or type of event) that has occurred for a plurality of user identifiers that are each associated with such attribute. The plurality of user identifiers and associated data sets are clustered into a plurality of user groups that each has similar data sets by weighting based on the attributes' relative correlation to the given success metric.

In a specific implementation, the success metric value for each attribute is a count of click events for user identifiers that possess such attribute. In another aspect, the success metric value for each attribute is a count of conversion events for user identifiers that possess such attribute. In a further aspect, the method includes stopping the clustering based on an evaluation metric of the clustering with respect to a golden set of the user identifiers that are known to belong to similar users. In one aspect, the golden set of user identities is known to belong to similar users based on having the same login information. In another aspect, the golden set of user identities is known to belong to similar users based on similar event history. In another aspect, the clustering is repeated based on a different golden set of user identifiers or a different evaluation metric. In another aspect, a different success metric value is determined correlated to a different type of event that has occurred for a plurality of user identifiers that are each associated with such attribute, and the clustering is repeated based on the different success metric, for example, to improve the success metric within certain user groups.

In a further aspect, any user identifiers that fail to meet a predetermined set of user identifier criteria are filtered prior to performing the clustering. In one example, the predetermined set of user identifier criteria specifies a minimum count threshold for each of the user identifier's associated attributes. In a further aspect, the predetermined set of user identifier criteria specifies a minimum count threshold for each user identifier's associated events or user interactions comprised in the associated events for each user identifier. In further aspect, the predetermined set of user identifier criteria also specifies a particular time period or frequency for the minimum count threshold.

In another embodiment, any attributes that fail to meet a predetermined set of attribute criteria are filtered prior to performing the clustering. In a further aspect, the predetermined set of attribute criteria specifies that if a particular success type of event is present in a user identifier's data set, then an exposure type of event must also be present in the user identifier's data set or any of the user identifier's attributes that are associated with such particular success type of event are filtered from the clustering operation. In one example, the predetermined set of attribute criteria specifies a minimum count threshold for user identifiers that are associated with each attribute. In another example, the predetermined set of attribute criteria specifies a maximum count threshold for user identifiers that are associated with each attribute. In yet another example, the predetermined set of attribute criteria specifies that each user identifier not be associated with any conflicting attributes and to filter such conflicting attributes for such user identifier if present.

In another embodiment, the invention pertains to a system having at least a processor and a memory. The processor and/or memory are configured to perform one or more of the above described operations. In another embodiment, the invention pertains to at least one non-transitory computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

BRIEF DESCRIPTION OF THE DRAWINGS

FIG. 5A illustrates an example user data set to which filtering techniques may be applied in accordance with one embodiment of the present invention.

FIG. 5B is a table illustrating user attributes and their associated total user counts, click counts, and conversion counts.

DETAILED DESCRIPTION OF THE SPECIFIC EMBODIMENTS

Figure 1:
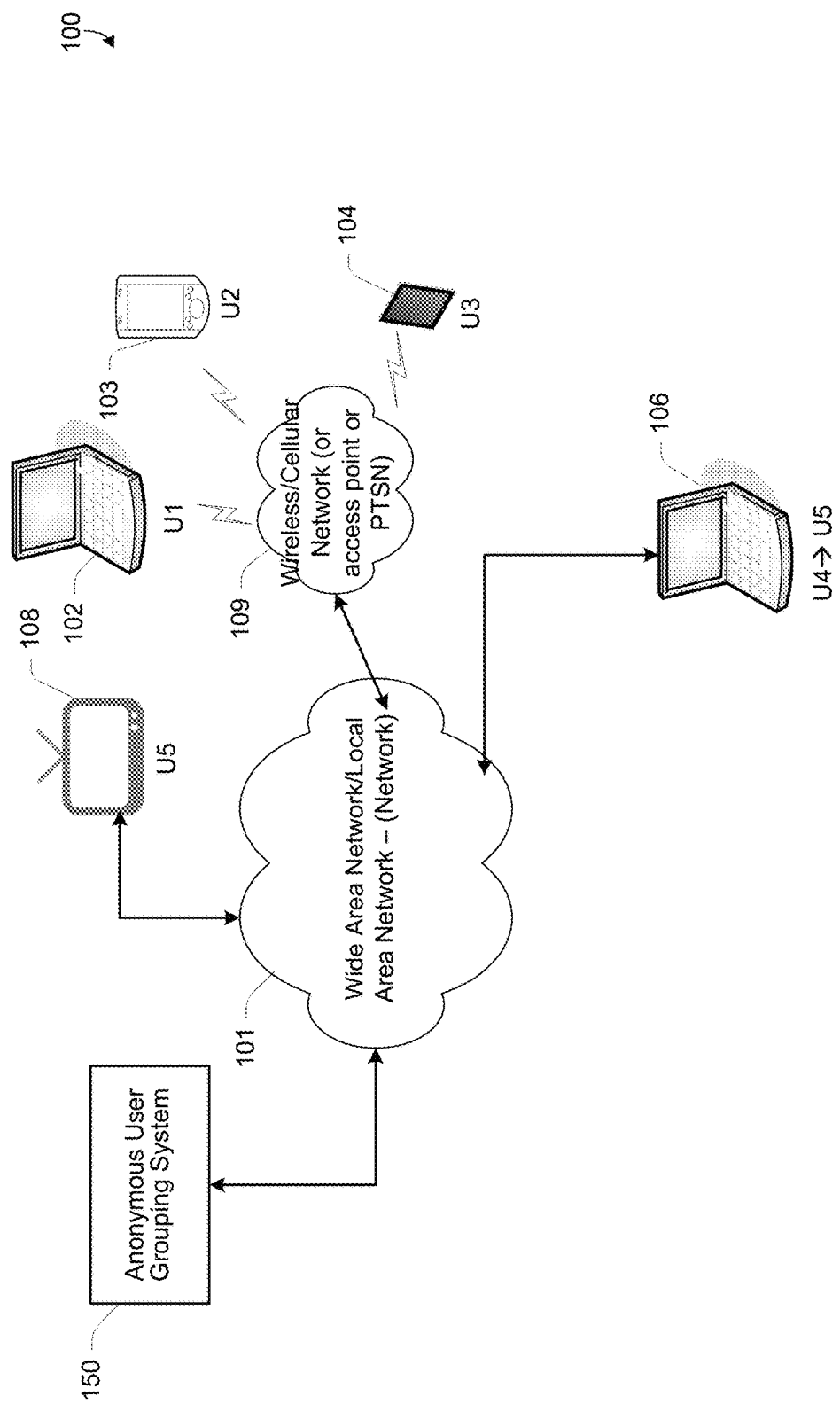
FIG. 1 is a diagrammatic representation of an example network portion in which techniques of the present invention may be implemented.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Various techniques and mechanisms of embodiments of the present invention are described herein in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Marketing campaigns often rely on the collection and tracking of user profile and event data for specific users. There are various ways to collect and manage user data. As users interact with various applications using various devices, these applications may anonymously assign user identifiers (IDs) for such users. For example, an on-line application may assign a random string as a user ID to a particular user that interacts with such application or web site (e.g., such as accessing a web page), and the assigned user ID is stored as part of a cookie on the particular user's device. Each time the user interacts with an application or web site for which a cookie has been stored, the user ID can be retrieved via the previously stored cookie and associated with user profile and event data, which may pertain to a user's on-line activities and one or more user characteristics.

Although user IDs that are assigned via cookies can sometimes be used to target particular users, cookies tend to result in multiple user IDs being generated for the same person. For instance, a device will tend to have multiple user IDs from different domain cookie user IDs being stored in a single browser or different cookie IDs being stored for different applications. The same user may also use different devices and be assigned multiple user IDs. Additionally, a cookie and associated user ID can be lost if a user replaces their device or browser or deletes cookies from his/her device. On average, cookies tend to last about 1 month.

Although user interaction data associated with different user IDs is available, a significant portion of such user IDs may belong to the same users and make it difficult to track how many times particular users are exposed to a particular marketing campaign. In certain embodiments of the present invention, mechanisms are provided for clustering user IDs and their associated data into sets that have each been determined to likely be the same user or share enough attributes to be treated as the same user for marketing purposes.

FIG. 1 is a diagrammatic representation of an example network portion 100 in which techniques of the present invention may be implemented. In general, various users may access one or more services or applications through the network through any suitable type of devices. The servers that provide services and applications to the user devices are not shown so as to simplify the drawing. Devices that are described herein may include any number and types of physical and/or virtual devices, such as smartphones or other mobile devices including browsers and/or apps, desktop or laptop computer including browsers, interactive television systems including browsers and/or apps, tablets, smart watches, wearable devices, etc. The term "device" is used herein to refer to the physical device itself or the software module (e.g., app or browser software) through which such physical device communicates with and identified by other devices or servers via a computer network.

In the illustrated example, user U1 of device 102 and user U2 of device 103 may belong to a same user, while user U3 of device 104, user U4 of device 106, and user U5 of device 108 may belong to different users having the same or sharing one or more user attributes or the like.

A user may use these devices through any number and type of devices and computer networks; such as through a wireless or cellular network (or a plain telephone system network or PTSN) 109 and one or more wide area (WAN) and local area networks (LAN) networks 101. A user may also use a device via a Bluetooth connection to a computer that is connected to a network. There are any number and type of device and network configurations through which a device may be used by one or more users.

Certain embodiments of the present invention include techniques and mechanisms for grouping user IDs into similar user groups based on associated user attributes and activity data. For instance, an anonymous user grouping system 150 may have access to user IDs and their associated user data and be operable to group similar users based on such user data. A marketer may view different users that share a particular set of attributes as a same user. That is, if such different users were identified as the same users (or similar users), the marketer could treat such different users as a same user in a particular campaign. For instance, running a particular advertisement campaign may include applying exposure goals or limits to a particular group of similar users.

In general, the user IDs and associated attributes and activity may be initially filtered and pre-processed, including the weighting of attributes that result in one or more optimum success metrics, so as to facilitate a subsequent user clustering process. A two-step clustering process may then be applied to the remaining user IDs based on the user attribute and activity data that remains and is associated with such user IDs. The resulting grouped users are more likely to be the same user although not guaranteed to be the same user.

Figure 2:
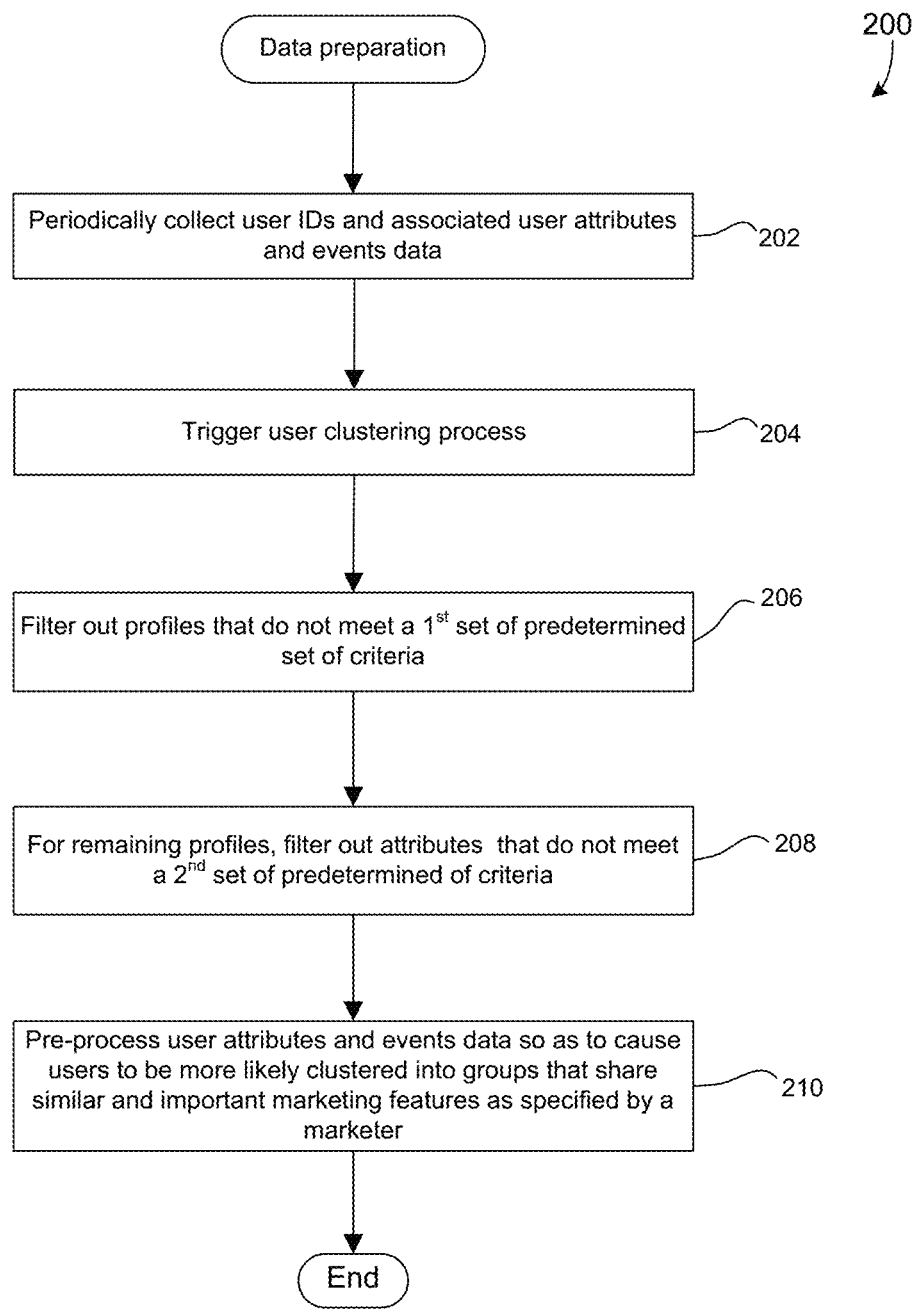
FIG. 2 is a flow chart illustrating a data preparation procedure in accordance with one embodiment of the present invention.

FIG. 2 is a flow chart illustrating a data preparation procedure 200 in accordance with one embodiment of the present invention. In general, user IDs and associated user attributes and event data are periodically collected as illustrated in block 202. For example, user IDs, which are mapped to associated user attributes and event data, may be obtained from any suitable source that has access to such user data.

Figure 3:
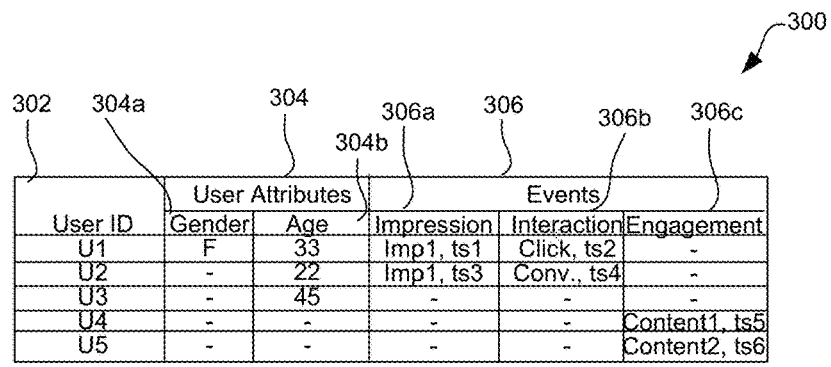
FIG. 3 illustrates a simple data structure that is representative of users and their associated user data.

FIG. 3 illustrates a simple data structure 300 that is representative of users and their associated user data. As shown, the table 300 includes a column for a user ID 302. The user ID 302 may be an anonymized and unique user identifier that is generated by the device, a service, advertiser, or a bid management or demand side platform (DSP). Other user identifying data may also include data that pertains to a unique device identifier and a device type, user login, email address, etc.

The table 300 may also include any number of a profile attributes columns 304, e.g., a gender attribute 304a and age attribute 304b. As shown, user U1 is associated with a gender attribute that is specified as female (F) and an age of 33, while users U2-U5 are not associated with a specified gender. Similarly, user U2 has an age attribute of while user U3 has an age attribute of 45. Although only two user attributes types are illustrated, each user identifier may be associated with any number and type of user attributes.

The attributes for each user may include any characteristics that was, is, or can be associated with the particular user u. To protect a user's privacy, attributes data may be stored with an anonymized type of user ID, such as an arbitrary or randomized identity, rather than the user's actual name, specific residency, or any other type of user identifying information. Examples of attributes data for a particular anonymized user u may include descriptive data, such as personal or professional interests, employment status, home ownership, knowledge of languages, age, education level, gender, race and/or ethnicity, income, marital status, religion, size of family, field of expertise, residential location (country, state, DMA, etc.), travel location, predictive data, such as likelihood to consume content or perform an activity, such as clicking on an ad, visiting a page or purchasing a product or service, in the near future, etc.

The attributes data of user u may also include contextual data, such as where the user is currently located, the weather at such location, current events at such location, etc. For instance, attributes data may include GPS (global positioning satellite) or access point location data for the user u at various points in time, and other contextual data may be scraped from other databases, such as a web site for weather, time of day, or entertainment event for a user's location.

User identifiers may also be associated with events data 306, including impression data 306a (e.g., impression identifier and time stamp data that is associated with a particular impression that was served to the user) and user interaction indicator 306b that specifies various interactions that the user had with respect to the particular impression and a time at which such interaction occurred. Interactions data may include clicks, downloads, site visits, mouse overs, video/audio play (or pause, forward, rewind, etc.), conversions, an engagement heat map, view based actions, etc. A heat map may illustrate a quantitative level of activity with respect to an impression or other content.

In the illustrated example, user U1 may be associated with impression data specifying an impression identifier "Imp1" at timestamp "ts1" and a corresponding "click" interaction at timestamp "ts2", while user U2 has also been presented with impression "imp1" at timestamp "ts3" and had a related conversion activity at timestamp "ts4." The user activity information may also include any suitable one or more metrics, such as count, absolute or relative value, average, mean, frequency, time duration, etc.

Other events data, besides data pertaining to impressions, may pertain to engagement activity 306c in which the associated user has engaged at a particular time. For example, marketing engagement may include an advertiser or marketer providing particular content on a product site so as to engage particular audience segments in various activities (such as publications, surveys, discussions, etc.). The interaction data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, timestamp, time duration, etc. As shown, user U4 engaged with content1 at timestamp ts5, while user U5 engaged with content2 at timestamp ts6.

As the device receives more impressions or engages in various marketing activities or content, multiple entries may be generated for the multiple impressions or engagements.

Although the illustrated user data table 300 shows a single entry for each user that includes user profile data and/or activity data for a single impression or engagement event, other data representations are contemplated. For example, one or more user entries may indicate one or more user profile attribute characteristics. Likewise, one or more user entries may indicate one or more impression or engagement attribute data sets. That is, each impression's or engagement event's data may be listed in a separate entry or listed together in a single user entry. The user profile attribute data entries may also be separated from the impression/engagement data entries.

Referring back to FIG. 2, a clustering process may then be trigged in operation 204. For instance, a new dataset may be received for clustering or an existing dataset may be updated. The clustering of users may be performed periodically so that the clustered groups output by the system accurately reflect the current datasets for particular time snapshots. The clustering process may also be triggered by a clustering request that is received from a marketer. A request may include any suitable type and number of clustering parameters as further described herein.

After a clustering request is received, user profiles that do not meet a first predetermined set of criteria in operation 206. In short, users that are not useful for grouping similar users are filtered out. Likewise, attributes that do not meet a second set of predetermined criteria may also be filtered out for the remaining users in block 208.

Figure 4:
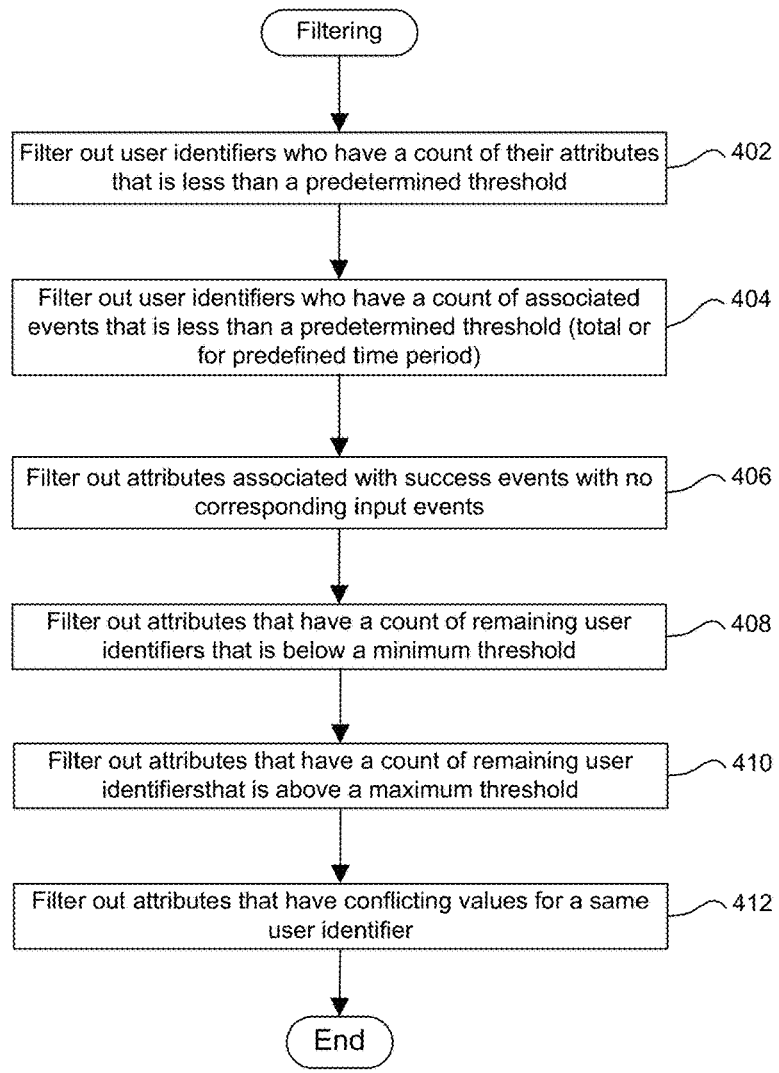
FIG. 4 is a flow chart illustrating a filtering procedure in accordance with a specific implementation of the present invention.

FIG. 4 is a flow chart illustrating a filtering procedure 400 in accordance with a specific implementation of the present invention. User identifiers who have a count of associated attributes that is less than a predetermined threshold may be optionally filtered in block 402. For instance, it may be determined that clustering users who have only 3 total attributes will not provide a useful grouping result for a particular marketing application. This minimum attribute count per user may be set by a marketer or automatically based on a previous analysis of user data that identified users who were not usefully grouped in a clustering process or would otherwise adversely affect the user clustering results.

FIG. 5A illustrates an abstract representation of a user data set 500 to which filtering techniques may be applied in accordance with one embodiment of the present invention. In this example, user attributes 504 can include any suitable attribute type that characterizes a user, such as profile, device, and browser attributes. If the attribute count threshold per user is 2 for the example of FIG. 5A, users U2 and U4 would be filtered out from the clustering process since they each have only two attributes A2 and A6, respectively.

User identifiers that have a count of associated events that is less than a predetermined threshold may also be filtered out in block 404. In other words, there may be a minimum attribute count for the event type attribute that differs from a total attribute count. For instance, users who have minimal on-line activity may not be usefully clustered with other more active users whose group behavior is more predictable for applying targeting or forecasting algorithms, or such group of low activity users may not be a valuable group for a marketer's purposes. The minimum event count threshold may be applied to the total event count that a user identifier currently has at the time of filtering process or applied to an event count per time period (or event frequency). For instance, user identifiers and their associated attributes that are associated with less than 10 associated events every 3 days may be filtered out.

The event threshold for each user may be applied to any suitable type of event counts for each user. For instance, a minimum count may be applied to any suitable combination of a count of any of the following user events or interactions: impressions shown to a user, clicks by the user, conversions, user sessions, downloads, site visits, mouse overs, video/audio play (or pause, forward, rewind, etc.), view based actions, form interactions, signing up for e-mails, etc.

In the example of FIG. 5A, a total count of both clicks and conversions may be compared to an event threshold of 2. In this example, user U3 would be filtered out since he/she has only 1 event activity in the form of a single conversion. In contrast, users U1, U2, U4, and U5 have total click and conversion counts that are equal to or greater than to the threshold of 2.

After the users with low event counts are filtered out, attributes may also then be analyzed and filtered out from being used in the clustering process. Attributes may be filtered out for a single user or all users. A particular attribute can be filtered out by a type and/or associated value not meeting a particular specification threshold or quality.

In the illustrated filtering example of FIG. 4, attributes that are associated with success events with no corresponding input event may be filtered out in block 406. For instance, if a user identifier is associated with a click or conversion event without a corresponding impression event attribute, the attributes associated with such unpaired event may be filtered out. Other types of events may be expected to have other types of triggering events that are presented to the user. In these cases, a user identifier is associated with a success action that cannot be correlated with an exposure event and such user's attributes cannot be reliably used for a user similarity clustering process. Alternatively, the unpaired success event may simply be removed from being associated with the particular user identifier without removing or filtering any other attributes associated with such user identifier.

In the example of FIG. 5A, the single click event "C" at timestamp "ts5" for user U4 would be filtered out since such click event "C" has no associated impression events. This user U4 may have other success events (not shown) that have corresponding trigger events and are not filtered out. Alternatively, the user attributes that are also associated with a single non-associated event may be deemed to be untrustworthy for clustering and such untrustworthy attributes are removed. Thus, attribute A6 is filtered since such attribute is associated with the unpaired click event "C" at timestamp "ts5."

In another example, since the click event "C" at timestamp "ts3" for user U1 has a corresponding impression event "I2" at timestamp "ts2", this click event is not filtered out. Likewise, since the conversion event "A" at timestamp "ts7" for user U5 has a corresponding impression event "I3" at timestamp "ts6", this conversion event is not filtered out.

Attribute types or values that are associated with a count of remaining user identifiers that is below a minimum threshold may also be filtered out in block 408. Similarly, attributes that have a count of remaining user identifiers that is above a maximum threshold may also be filtered out in block 410. The attributes that do not meet the particular minimum and/or maximum count (or percentage) thresholds may be filtered from use in the clustering process for all user identifiers. For example, a browser type attribute may be filtered from all remaining user identifiers prior to performing a clustering process for such user identifiers.

The minimum and maximum user counts per attribute may be predefined in any suitable manner to remove attributes that are associated with too few users or too many users and would not be usefully included in a similarity grouping analysis. For instance, attributes that are prevalent in almost every user (e.g., everyone has a browser attribute) may not be especially useful as a factor in finding similar user groups. In another example, attributes that are not used by a minimum number of users may not be correlated with enough users to result in usefully sized user groups. Any suitable factors, such as a distribution analysis to identify the two-sigma range of user counts per attribute, may be used to select a minimum and/or maximum user threshold for a particular attribute. Attributes that fail the minimum and maximum threshold requirements for number (or percentage) of associated user profiles may be thrown out from the entire data set that is to be clustered.

FIG. 5B is a table 550 illustrating user attributes and their associated total user counts, click counts, and conversion counts. If the minimum total user count for any attribute is 50, attributes A4 and A5 may be filtered out since they only have user counts of 25 and 10, respectively. Likewise, if the maximum total user count is 2 million, attribute A1 is filtered out since it has a total user count of 3,010,001, which represents a high percentage of users. In this example, only attributes A2 and A3 are used for the clustering process.

In various embodiments, a user count or percentage threshold may be applied to a particular attribute type or a particular attribute value. For instance, a gender attribute type can have a value of female or male for a particular user. In one implementation example, the gender attribute may be filtered from the clustering process if the counts for the user identifier associated with the gender attribute fails to meet minimum or maximum thresholds. In another implementation, the gender attribute may be filtered if a count of users fails to meet a specific count for female and/or male users or a particular proportional percentage of male and female users (e.g., 50%). Additionally, an attribute that is filtered may pertain to any type of attribute, such as a user profile attribute (e.g., gender or age), a device attribute (e.g., physical or virtual device), a contextual attribute (e.g., weather, time of day), an event or engagement attribute.

Although certain metrics, such as count or percentage, are described herein as being compared to a predefined threshold or specification, other metrics may be used for filtering. For instance, an average or standard deviation value for conflicting attributes may be assessed and such attribute data filtered out at certain average or standard deviation thresholds for a particular user or data source or the entire data set.

Additionally, a data source may have an unexpected percentage of a particular attribute, even if such attribute does not conflict as applied to each single user. For instance, a male gender attribute would be expected to occur in about 50% of the user population of a generic search service and a data source that provides such user data. If more than 90% of the users from this particular data source are male, the data source from such particular data source may be determined to be unreliable and filtered out of the clustering process.

Referring back to FIG. 4, attributes that have conflicting values for a same user may also be filtered out in block 412. For instance, if a user who is identified with their hashed email address logs in as a female for one set of sessions with a particular data source publisher and logs in as a male for another set of sessions with the same publisher, it may be determined that these gender attributes for this particular user are not useful and are filtered out. Another type of attribute that may be determined to have conflicts is a geolocation value. For instance, if different locations are logged too frequently (e.g., impossible to travel a particular distance in a minimum amount of time), the geolocation attribute may be filtered out for such user. Alternatively, users who have any conflicting attribute may be filtered out entirely from the clustering process.

Conflicting attributes may be filtered out for a particular user while keeping such particular user's other attributes, which do not conflict. For instance, a user may have incorrectly entered one attribute. However, if a particular user has a significant number of conflicting attributes, the user and all his/her attributes may be filtered out of the clustering process. In another example, attributes that were obtained from a particular data source may conflict at a significant level, and the entire data set may be thrown out as untrustworthy. For instance, if more than predefined number or percentage of attributes (e.g., 20%) from a particular data source is conflicting, it may be determined that the particular data source is untrustworthy and the data source's entire data set is thrown out.

The various filtering criteria may be predefined in any suitable manner. For instance, an advertiser may specify one or more of the following filtering criteria: an attribute per user count threshold, an event per user count thresholds, a success event type and its corresponding triggering event type, minimum or maximum user count per attribute, specification of conflicting attribute values for a same user (e.g., both male and female), expected attribute value proportions (e.g., 50% female and 50% male), deviation threshold (e.g., from expected attribute value proportions), etc.

Figure 6:
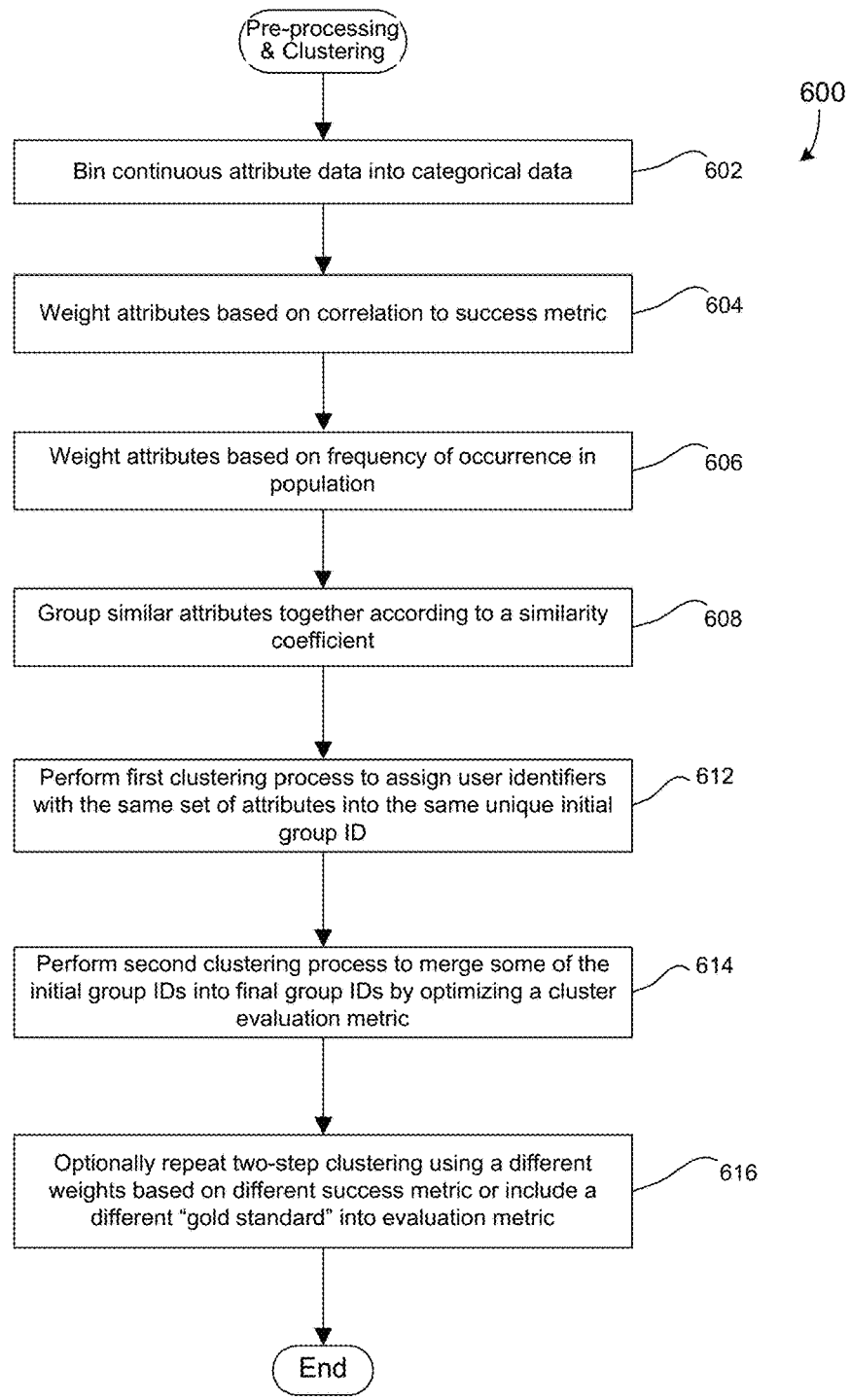
FIG. 6 is a flow chart illustrating a pre-processing and clustering procedure in accordance with one embodiment of the present invention.

After the user profiles and attributes are filtered, the remaining data may be pre-processed and clustered. FIG. 6 is a flow chart illustrating a pre-processing and clustering procedure 600 in accordance with one embodiment of the present invention. Continuous attribute data may be optionally binned into categorical data values in operation 602. In general, attribute values can be bucketized to make user data more similar. In one specific implementation, the age attribute values may be binned into the following categories: under 18, 18-25, 26-40, 41-55, and 56 and older. In the example of FIG. 3, user U1, U2, and U3 have their age values of 33, 22, and 45 binned into the age categories 26-40, 18-25, and 41-55, respectively.

Any suitable type of continuous attribute may be binned. Examples include binning specific incomes into income ranges, binning specific ages into age ranges, binning specific conversion amounts from purchase transactions into currency ranges, binning specific customer lifetime values into customer lifetime value ranges, etc. The particular ranges or categories may be selected based on any particular factor. In one embodiment, marketers select ranges for particular attributes, such as age and income, so that the users with the particular range tend to result in similar success metrics (e.g., user click or action rate for a particular ad or product).

The remaining attributes may then be weighted based on a correlation to a success metric in operation 604. A correlation can generally be determined between a particular user attribute and a particular desired outcome, such as clicking on an impression. That is, it is determined which attributes are more important for achieving a desired action from users. The success metric and weights can be selectively tailored for each advertiser or marketer, product, or website.

In one implementation, each attribute type or value may be correlated to a particular success metric over the entire data set of users (before or after filtering). The success metric may be selected with respect to a particular impression or set of impression from a particular advertisement campaign, brand, or other type of engagement opportunity that is presented to (or accessible by) a user. A success metric may include any suitable action, such as a click, conversion, coupon download or use, installation of an app, in-store visit, in-store purchase, form completion, etc.

In the example of FIG. 5B and for each 1000 impressions, attribute A1 can be correlated to a click rate of 500 and a conversion rate of 5, while attribute A2 is correlated to a click rate of 5 and a conversion rate of 1. In one implementation, all the success events that occurred with users with a particular attribute Ax are counted for a particular set of impressions to obtain a count for such attribute Ax. This process is repeated for each of the other attributes. If a user has a plurality of attributes and has performed the particular success event that is being assessed, this user's success event is counted for each of his/her attributes.

The attributes can then be weighted relative to one another based on their relative success metric values (e.g., with respect to a particular set of impressions). If the success metric is click rate, attribute A1 of Figure 5B can be associated with a weight that is 100 times the weight of A2. If the success metric is conversion rate, the attribute A1 then has a weight that is 5 times the weight of A2. In sum, the success events for a particular impression or engagement opportunity can be counted for each attribute across the entire user data set, and each attribute (or a portion of the attributes) is then weighted based on the relative counts.

The weighting of attributes will affect the clustering process so that users that share more important attributes (e.g., higher success metric count) are more likely to be clustered together and distinguished from users with other less important attributes (e.g., lower success metric count). In a simplified example, it may be found that female users are much more likely to click on advertisements for yoga pants, as compared to male users. Likewise, the female gender attribute may be found to have a higher success rate for clicking on yoga ads, than the click rate for users with various age attributes. In other words, gender may correlate better than age to a click rate for yoga ads. In this example, gender attribute differences may be weighted higher in the clustering process than the age attributes so that the female attribute can be more likely distinguished so that a valuable female user group can be found in a clustering process.

Figure 7A:
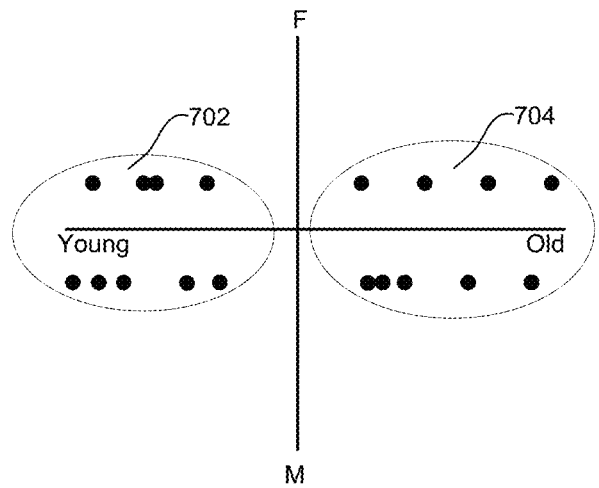
FIG. 7A is a two dimensional scatter plot of gender and age attribute values for a particular set of users without inclusion of a weighting process.

FIG. 7A is a two dimensional scatter plot of gender and age attribute values for a particular set of users without inclusion of a weighting process. A clustering process may be performed on these users based on their age and gender attributes and other attributes that are not shown) and the clustering may result in various groups, depending on selection of the particular clustering initial parameters and evaluation metrics. If two clusters are to be formed, the clustering may result in clusters 702 and 704. Thus, the users with a female attribute are not distinguished from users with a male attribute, but all the female and male users are separated into old and young attribute clusters, even though the female attribute is an important marketing factor for click rate on yoga ads.

In a weighted clustering process, an attribute type, such as a gender attribute, can be weighted so that different gender attribute values (e.g., female vs. male) are made more distinct than other less valuable attributes. In the example of FIG. 7A, it may be desirable to weight the gender attribute so that there is a larger difference between the female and male gender attributes, as compared to the age attribute values. If the female attribute has been found to result in 10 times as many clicks than the male attribute and any of the age attribute categories, the female attribute may be given a weight of 10, while the age attributes retain a weight of 1.

Figure 7B:
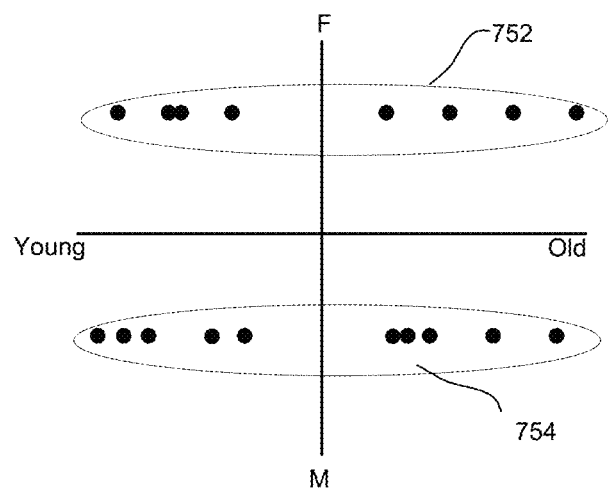
FIG. 7B illustrates clustering results for the user data of FIG. 7A after a female attribute has been weighted more than an age and male attribute.

FIG. 7B illustrates clustering results for the user data of FIG. 7A after the gender attribute has been weighted more than the age attribute. In this specific implementation, the distance (e.g., or scaled numerical value) between the male and female attributes has been weighted more than the distance between the age attributes so that duster groups 752 and 754 are formed. In this later example, the clustering correlation becomes more biased towards separating users with different gender.

Referring back to FIG. 6, attributes may alternatively or additionally be weighted based on their frequency of occurrence in the user population relative to a higher frequency of co-occurrence in same user profiles in operation 606. Thus, if users who are most associated with a success event have a higher frequency of co-occurrence of particular attributes than among users less associated with a success event, these attributes can be used to bias the set of attributes used in the clustering process.

Any similar attributes may also be optionally grouped together using any suitable similarity metric, such as a Jaccard similarity coefficient, in operation 608. That is, the attribute data set can be pre-processed to measure the similarity between attributes and similar attributes can be grouped together based on the level of similarity. This pre-processing reduces the dimensionality of the data set used in the user clustering. The Jaccard coefficient measures similarity between finite sample sets and is defined as the size of the intersection divided by the size of the union of the sample sets A and B:

$$J(A, B) = \frac{|A \cap B|}{|A \cup B|}$$

For example, if when analyzing the dataset it was found that Male Gender was so strongly correlated among users with the attribute of an interest in Bull Fighting, then these two attributes could be combined into a new single joint attribute.

An initial clustering process may be performed to assign user identifiers with the same attributes to the same unique initial group ID in operation 612. In one technique, each user identifier's attributes are mapped to a multi-byte integer. First, the attribute categories of each attribute type can be assigned scaled numerical values. For instance, the gender attribute has two possible values, female and male, which can be scaled from 0 to 1. A gender attribute value of female can be assigned a 1, while a male attribute value can be assigned a 0. In another example, an age category may have 5 bins of increasing age ranges, which can be assigned values from 0 to 1. For instance, the lowest age range may be assigned a value of 0; the next lowest age range assigned a value of 0.25; the middle age range assigned a value of 0.5; the second highest age range assigned a value of 0.75; and the highest age range is assigned a value of 1.

Alternatively, each attribute category can be assigned a bit value for such attribute category being present or not present for a particular user identifier. For instance, a user identifier can be associated with a female attribute and/or a male attribute. If a user has a female attribute, this female attribute may be assigned a value of 1. If a user does not have a female attribute, this user may be associated with a female attribute having a value of 0. Similar values can be assigned for a user having (or not having) a male attribute; as well as other attribute type categories.

After the attribute values for each data set are assigned values, these values may then be weighted as described above. For example, a female attribute may be correlated with a click count for a yoga ad that is 10× the correlation for the male attribute or any age category. The female attribute could be weighted by 10, while the male attribute and all age category values are weighted by 1. In another example, the youngest users could be found to click on a yoga ad 5× as much as the oldest users and any male users, while female users have 10× higher number of clicks than male users and the oldest users and 2× as much as the youngest age group. In this last example, the attribute weights could be distributed as follows: male=1, oldest=1, youngest=5, female=10. Alternatively, weights can be applied to distance calculations for the attributes of different user identifiers as further described herein.

Figure 8:
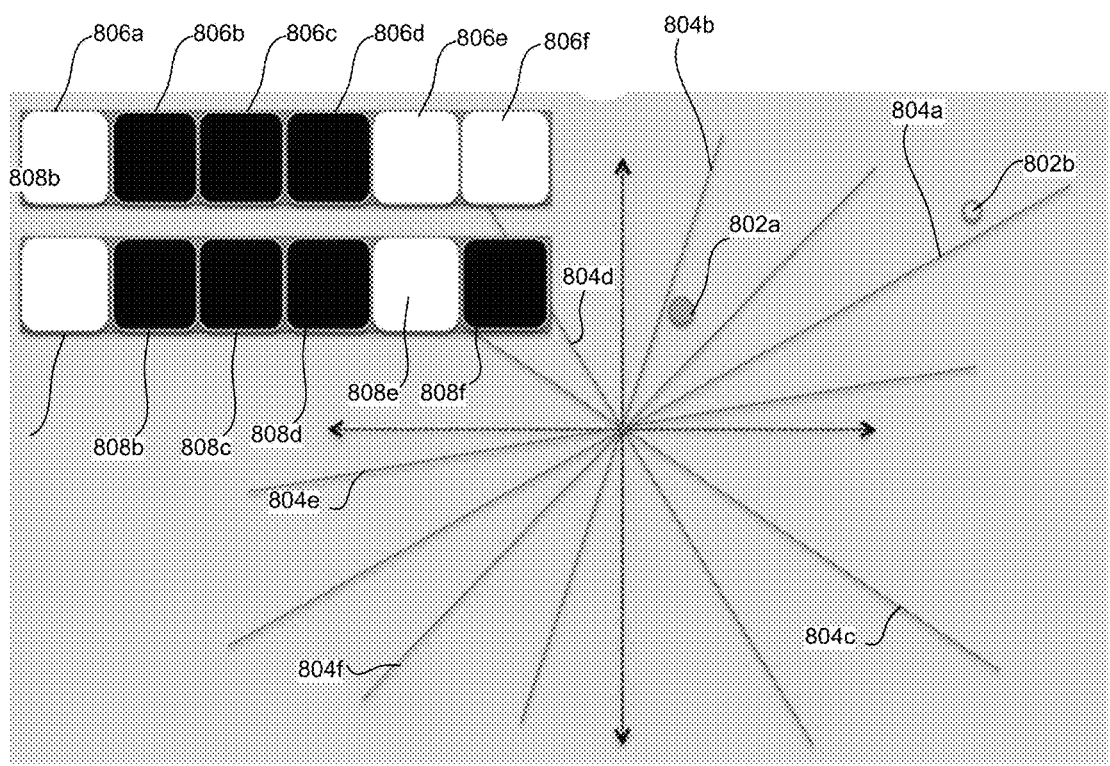
FIG. 8 is a diagrammatic representation of a LSH approach applied to the attributes of the remaining set of users in accordance with a specific implementation of the present invention.

Each data set can then be transformed into a unique multi-byte integer values. One technique for mapping attributes to multi-byte integer values is the locality-sensitive hashing (LSH) technique, which can facilitate finding users who have similar or shared attributes. FIG. 8 is a diagrammatic representation of a LSH approach applied to the attributes of the remaining set of users in accordance with a specific implementation of the present invention. In a simple two-dimensional example, the attribute data sets 802a and 802b for two users are plotted.

The two data points are overlaid with a set of uniformly spaced random planes; e.g., 804a~804f. Each data point's location is encoded with a plurality of bits or "hash value" so that each bit value of 1 or 0 is based on whether the data point is "below" or "above" each plane. In this example, the data point 802a is assigned data bits 806a-806f (white representing 0 or above; black representing 1 or below) for planes 804a-804f, respectively. Likewise; data point 802b is assigned data bits 808a-808f for planes 804a-804f, respectively. Of course, the same principal can be applied to a significantly higher number of dimensions using more bits to correspond to more planes. Users having a same hash value may be grouped into a same initial group ID.

Referring back to FIG. 6, a second clustering process may then be performed to merge the initial group IDs into subsets of final group IDs by maximizing a cluster evaluation metric in operation 614. In general, an unsupervised machine learning algorithm can be used to find and merge clusters having similar attribute data across the initial groups. In alternative embodiments, the user ID's may be combined into a single initial group and a partitioning type clustering algorithm may be used to partition the initial group into a final set of groups. Clustering examples may include any suitable partition or agglomerative based models.

Figure 9:
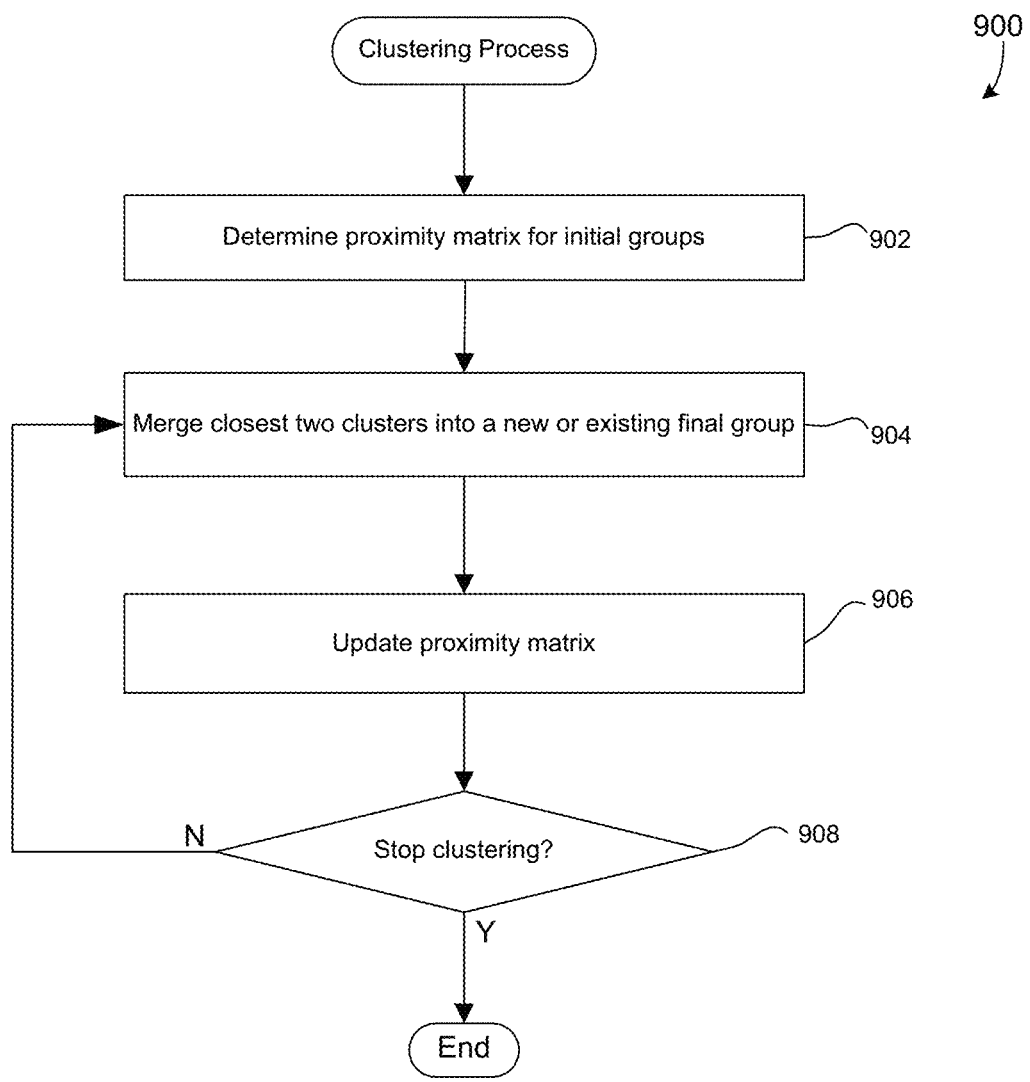
FIG. 9 is a flow chart illustrating an agglomeration clustering technique in accordance with a specific implementation of the present invention.

FIG. 9 is a flow chart illustrating an agglomeration clustering process 900 in accordance with a specific implementation of the present invention. Initially, a proximity matrix for the initial groups may be determined in operation 902. The proximity matrix generally specifies a distance between the attribute sets of each pair of initial groups. In one embodiment, the attribute data sets for each initial group may be transformed into weighted integer or bit values as described above with respect to FIG. 8. The transformed and weighted attribute data sets for each initial group can then be hashed as described above with reference to FIG. 8 before determining distances between initial groups. The hash values for each initial group can be used to determine a distance between the corresponding data points of pairs of initial groups. For instance, the data points 802a and 802b of FIG. 8 have a hamming distance (h) of 1 since their signatures vary by only a single bit (i.e., only bits 806f and 808f differ). Based on a hamming distance h and a signature bit length b, cosine similarity can also be determined based on these hash values by:

$$\cos\left(\frac{h}{b}\pi\right) \text{ or } \cos\left(\frac{1}{6}\pi\right)$$

Referring back to FIG. 9, the closest two initial groups can be merged into a new or existing final group in operation 904. For example, the two initial groups that have the most similarity may be merged together into a new final group. The proximity matrix may then be updated in operation 906. As new final groups are assigned to different user identifiers and corresponding attribute data sets, the proximity matrix may be based on any suitable distance measurement between such initial or final groups. For example, distance between two groups may be defined as the distance between two closest attribute sets of the two groups (single link), the farthest two attribute sets of the two groups (complete link), average distance between group data sets, distance between average or most representative attribute data set (e.g., centroid or medoid), etc.

After a new cluster is formed by merging two clusters, it may be determined whether to stop the clustering process in operation 908. If the clustering is not to be stopped, two other next closest clusters may be merged into a new or existing cluster and the proximity matrix updated. Otherwise, the clustering process stops.

A cluster process may be stopped based on any suitable factor for determining the "goodness" of the clustering results. In a specific example, a "goodness" clustering evaluation metric may be determined from a "golden standard" set of user IDs for which it is known which user IDs belong to a same user. For instance, different user Ms from different devices may also be associated with the same user login identification for a particular web service. In another example, users who are determined to have very similar event or engagement history (such users who visit the same pages within the same time period and who have a similar page dwell time) may be defined as a golden set of similar users. The golden standard set of user IDs, as well as other user ID's, can be included in the clustering process, and the clustering process can be terminated when it is determined that the golden set has been clustered to a particular level of correctness. One measure of correctness is the RAND index.

In other embodiments, a golden set of users may be used to determine a difference between an average click rate for correctly clustered user 1D's and the average click rate for individual user ID's. For example, the average click rate for a cluster of golden users can be determined to be double the average click rate of individual golden users. The clustering process can then be stopped after a particular percentage of this average click rate difference is reached between cluster users and individual users. The stop metric can also be in the form of an average conversion rate difference, web page dwell time difference, etc.

Referring back to FIG. 6, any of the clustering operations (e.g., 612 and 614) may be optionally repeated by adjusting any suitable clustering factor in operation 616. For instance, different attributes weights may be defined based on a different success metric (a click metric vs. a conversion metric). In another example, the "golden standard" set of users may be replaced with a different golden set of users. For instance, the golden user set may be defined based on independent user login information, instead of users who have similar event histories, or visa versa. Alternatively, different user characteristics between clusters and individual users (e.g., average conversion difference vs average click rate difference) may be gleaned from a golden user set and used to evaluate the correctness of the clustering results so as to determine when the clustering should stop. The different clustering results may then be combined or averaged together, or the individual results could be used for different purposes.

In an alternative embodiment, the user ID's may initially be grouped all together in an initial group and a partition type clustering model may be used to split the initial group into a plurality of final clusters. For instance, one or more user ID's that have a greatest distance from a centroid or medoid of the initial cluster may be split off from the initial group to form two split groups. One or more user ID's may be split off from each split group and merged with other split groups based on proximity values. This splitting/merging is repeated until an evaluation metric is reached.

Certain embodiments of the present invention facilitate the creation of sub-populations of similar users from a large user data set for apparently different users. The statistics for marketing to individual user attributes can be aggregated together to highlight sub-populations of users with combined user attributes that are more likely to perform desired actions, such as clicking on an ad or performing a conversion action. For example, a male gender attribute and an age of under 25 attribute may be individually correlated with a weak level of likelihood of conversion. A sub-population of users who are both male and below the age of 25 may have a stronger correlation to a likelihood of success. Thus, a grouping of users who are both male and over age 25 may provide a population of valuable users. In other words, one may be able to achieve greater statistical significance if users are grouped by high value attributes. For example, marketing decision can then be based on the aggregated statistics of smaller user groups.

Figure 10:
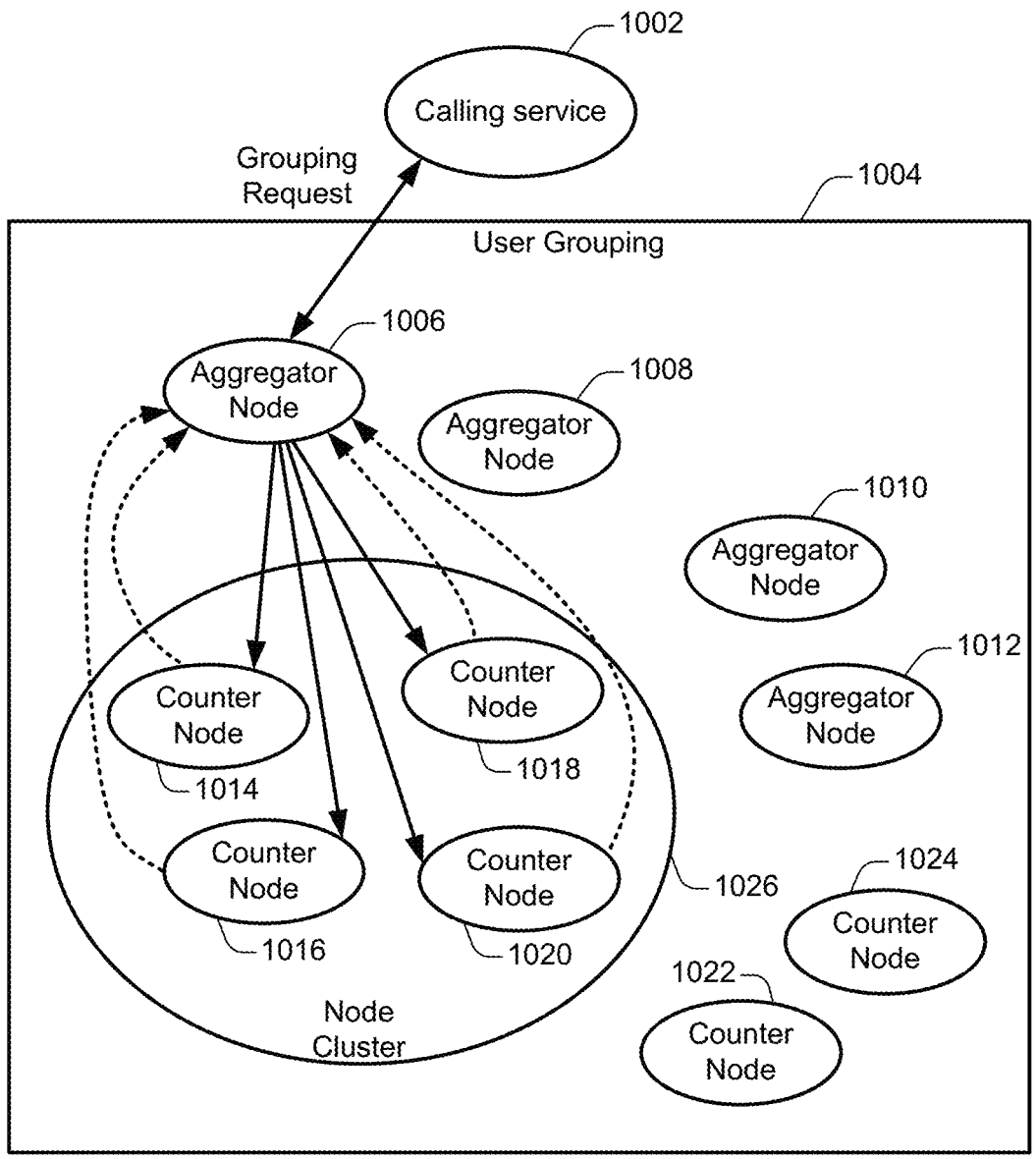
FIG. 10 illustrates an example of a system for executing clustering queries, configured in accordance with one or more embodiments.

The disclosed techniques of the present invention may be implemented in any system or any suitable combination of software and/or hardware, such as distributed network of processors. FIG. 10 illustrates an example system for executing clustering queries, configured in accordance with one or more embodiments. The system illustrated in FIG. 10 includes a calling service 1002 that communicates with a user grouping system 1004. The user grouping system 1004 includes aggregator nodes 1006-1012 and counter nodes 1014-1024. Several of the counter nodes are included within a counter node sub-cluster 1026.

According to various embodiments, a node may be a server having a processor and memory. Alternately, different nodes may be implemented on different processors within a server.

In order to handle a larger user data size, the user data may be distributed over a set of servers. Since the queries are easily parallelizable, overall system latency may be significantly reduced. Also, the results from many queries over a single sample may be calculated simultaneously.

According to various embodiments, the calling service 1002 represents any system configured to transmit a query request to the user grouping system. For instance, the calling service 1002 may be a system configured to receive request information from advertisers and formulate grouping queries based on the request information. The user grouping system 1004 includes a collection of counter nodes and aggregator nodes that together can receive a query request, execute the query request, and return a result.

The aggregator nodes 1006-1012 receive requests from calling services and coordinate query activity among the counter nodes. In some embodiments, each clustering request is wrapped in a collector and added to a queue. When an aggregator begins processing a query request, the aggregator node selects a subcluster of counter nodes to execute the request. Then, the aggregator node distributes the query request among the selected sub-cluster of nodes.

According to various embodiments, the aggregator node receives partial results from the counter nodes and aggregates the partial responses into a final result. For instance, each counter node may perform various tasks with respect to the data sets that are present on the counter node that satisfy the query parameters. For example, each node may count attributes for each user profile, count users for each attribute, etc. In particular embodiments, this distinction of responsibilities may allow the system to process an increasing amount of data while adding only a relatively small constant overhead of network communication and the increased time of partial report aggregation as new servers are introduced.

When an aggregator node receives partial responses from the counter nodes, the aggregator node may perform any necessary calculations to process the partial responses. For instance, the aggregator node may calculate distance values or a proximity matrix based on results received from different nodes. The calling service may then complete the clustering based on the results received from the aggregator nodes. In order to combine the cluster results generated from the various nodes, the clustering model for how to weight each attribute and how each cluster was defined would be preferably determined first in certain embodiments.

According to various embodiments, user grouping may be performed periodically. For instance, a dataset may be updated with new user data, and a new group clustering may be initiated to reflect the updated dataset. The resulting user groups may then be stored on a network-accessible file system that can be accessed from the network nodes, such as the counter nodes within the clustering system. For instance, the user groups may be stored on a Hadoop File System (HDFS).

A "zookeeper" system may supervise the distribution of the data sets among the counter nodes and may notify each counter node when a new data set is available for that counter node. According to various embodiments, the user data may be divided into per server sub-samples. The sub-samples may have similar user data, but different Observations, so that different counter nodes store different portions of the user data.

Figure 11:
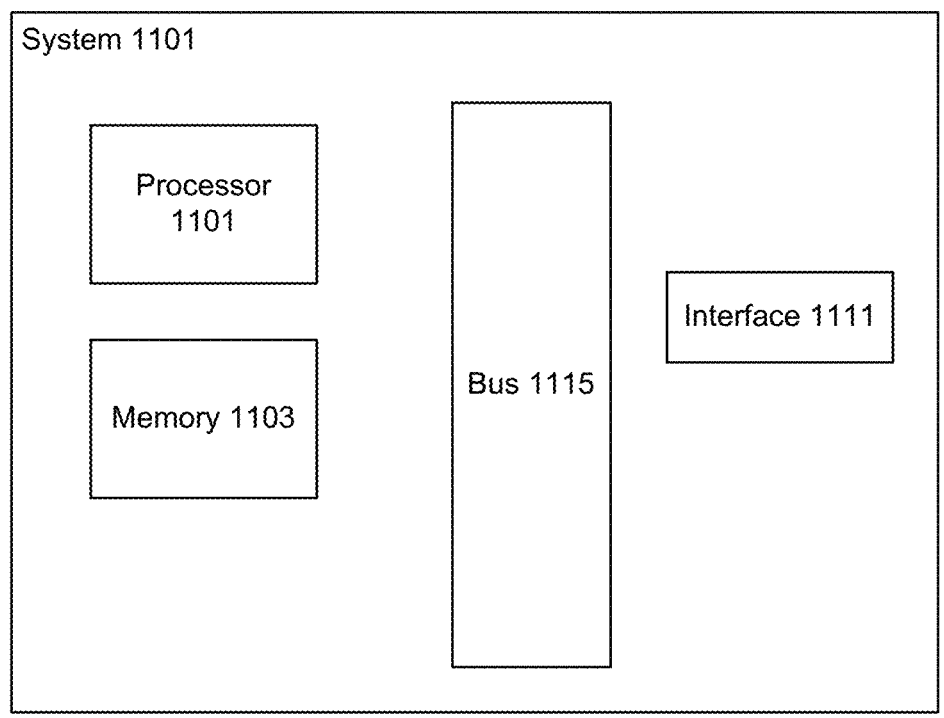
FIG. 11 illustrates an example of a server, configured in accordance with one or more embodiments.

FIG. 11 illustrates one example of a server. According to particular embodiments, a system 1100 suitable for implementing particular embodiments of the present invention includes a processor 1101, a memory 1103, an interface 1111, and a bus 1115 (e.g., a PCI bus or other interconnection fabric) and operates as a counter node; aggregator node, calling service, zookeeper, or any other device or service described herein. Various specially configured devices can also be used in place of a processor 1101 or in addition to processor 1101. The interface 1111 is typically configured to send and receive data packets over a network.

Particular examples of interfaces supported include Ethernet interfaces, frame relay interfaces, cable interfaces, DSL interfaces, token ring interfaces, and the like. In addition; various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Because such information and program instructions may be employed to implement the systems/methods described herein; the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for finding similar on-line users for advertisement or content targeting, the method comprising:
    by a plurality of processor nodes of a grouping system, receiving a query and together obtaining a plurality of user data sets associated with a plurality of user identifiers for a plurality of anonymous users, wherein each user data set of each user identifier specifies one or more user attributes and on-line user events that have occurred for such user identifier, wherein the on-line user events each comprises an exposure event for exposing a user to an on-line advertisement impression or content or a success event for a user action that is performed with respect to an advertisement impression or content;
    by the plurality of processor nodes of the grouping system, counting for each user attribute the success events for a set of impressions or content and across the plurality of user data sets to obtain a success event count for each user attribute across the plurality of user data sets; and
    by the plurality of processor nodes of the grouping system, clustering the plurality of user identifiers and their associated user data sets into a plurality of user groups by weighting each user attribute based on its success event count relative to other success event counts of other user attributes, wherein weighting of the user attributes affects the clustering so that user identifiers that have one or more shared attributes with higher success event counts across the plurality of user data sets are more likely to be clustered together and distinguished from user identifiers that have other shared attributes having lower success event counts across the plurality of user data sets.

2. The method of claim 1, further comprising filtering any user identifiers that fail to meet a predetermined set of user identifier criteria prior to performing the operation for clustering, wherein the predetermined set of user identifier criteria specifies a minimum count threshold for each of the user identifier's associated user attributes.

3. The method of claim 1, further comprising filtering any user identifiers that fail to meet a predetermined set of user identifier criteria prior to performing the operation for clustering, wherein the predetermined set of user identifier criteria specifies a minimum count threshold for each user identifier's associated events and a particular time period or frequency for the minimum count threshold.

4. The method of claim 1, further comprising:
    filtering any user identifiers that fail to meet a predetermined set of user identifier criteria prior to performing the operation for clustering; and
    filtering any user attributes that fail to meet a predetermined set of attribute criteria prior to performing the operation for clustering.

5. The method of claim 4, wherein the predetermined set of attribute criteria specifies that if a particular type of success event is present in a user identifier's data set, then an exposure event for such particular type of success event must also be present in the user identifier's data set or the particular type of success event that is present, for which an exposure event is not present, in the user identifier's user attributes is filtered from the clustering operation.

6. The method of claim 4, wherein the predetermined set of attribute criteria specifies a minimum count threshold for user identifiers that are associated with each user attribute.

7. The method of claim 4, wherein the predetermined set of attribute criteria specifies a maximum count threshold for user identifiers that are associated with each user attribute.

8. The method of claim 1, wherein the success event count for each user attribute is a count of click events for user identifiers that are associated with such user attribute.

9. The method of claim 1, wherein the success event count for each user attribute is a count of conversion events for user identifiers that are associated with such user attribute.

10. The method of claim 1, further comprising stopping the clustering based on an evaluation metric of the clustering with respect to a golden set of the user identifiers that are known to belong to similar users, wherein the golden set of user identities is known to belong to similar users based on having the same login information.

11. The method of claim 1, further comprising stopping the clustering based on an evaluation metric of the clustering with respect to a golden set of the user identifiers that are known to belong to similar users, wherein the golden set of user identities is known to belong to similar users based on similar event history.

12. The method of claim 1, further comprising:
    stopping the clustering based on an evaluation metric of the clustering with respect to a golden set of the user identifiers that are known to belong to similar users; and
    repeating the clustering based on a different golden set of user identifiers.

13. The method of claim 1, further comprising:
    stopping the clustering based on an evaluation metric of the clustering with respect to a golden set of the user identifiers that are known to belong to similar users; and
    repeating the clustering based on a different evaluation metric.

14. The method of claim 1, further comprising:
    by the grouping system and for each user attribute, counting a different type of success event for a user action that has occurred for a plurality of user identifiers that are each associated with such user attribute to obtain a different type of success event count; and
    repeating the operation of clustering based on the different type of success event count of each user attribute.

15. A grouping system for finding similar on-line users for advertisement or content targeting, the system comprising:
    at least a grouping processor;
    at least a memory; and
    an interface for communicating with a plurality of processor nodes,
    wherein the grouping processor and/or memory are configured to perform or initiate the following operations in coordination with the processor nodes via the interface:
        sending a query via the interface to the processor nodes to obtain a plurality of user data sets associated with a plurality of user identifiers for a plurality of anonymous users, wherein each user data set of each user identifier specifies one or more user attributes and on-line user events that have occurred for such user identifier, wherein the on-line user events each comprises an exposure event for exposing a user to an on-line advertisement impression or content or a success event for a user action that is performed with respect to an advertisement impression or content;

counting for each user attribute the success events for a set of impressions or content and across the plurality of user data sets to obtain a success event count for each user attribute across the plurality of user data sets; and sending a query via the interface to the processor nodes to cluster the plurality of user identifiers and their associated user data sets into a plurality of user groups by weighting each user attribute based on its success event count relative to other success event counts of other user attributes, wherein weighting of the user attributes affects the clustering so that user identifiers that have one or more shared attributes with higher success event counts across the plurality of user data sets are more likely to be clustered together and distinguished from user identifiers that have other shared attributes having lower success event counts across the plurality of user data sets.

16. The system of claim 15, wherein the grouping processor and/or memory are further configured for filtering, or sending a query to the processor nodes to together filter, any user identifiers that fail to meet a predetermined set of user identifier criteria prior to performing the operation for clustering, wherein the predetermined set of user identifier criteria specifies a minimum count threshold for each of the user identifier's associated user attributes.

17. The system of claim 15, wherein the grouping processor and/or memory are further configured for filtering, or sending a query to the processor nodes to together filter, any user identifiers that fail to meet a predetermined set of user identifier criteria prior to performing the operation for clustering, wherein the predetermined set of user identifier criteria specifies a minimum count threshold for each user identifier's associated events, wherein the predetermined set of user identifier criteria also specifies a particular time period or frequency for the minimum count threshold.

18. The system of claim 15, wherein the grouping processor and/or memory are further configured for filtering, or sending a query to the processor nodes to together filter, any user attributes that fail to meet a predetermined set of attribute criteria prior to performing the operation for clustering, wherein the predetermined set of attribute criteria specifies that if a particular type of success event is present in a user identifier's data set, then an exposure event for such particular type of success event must also be present in the user identifier's data set or the particular type of success event that is present, for which an exposure event is not present, in the user identifier's user attributes is filtered from the clustering operation.

19. The system of claim 15, wherein the grouping processor and/or memory are further configured for filtering, or sending a query to the processor nodes to together filter, any user attributes that fail to meet a predetermined set of attribute criteria prior to performing the operation for clustering, wherein the predetermined set of attribute criteria specifies a minimum count threshold for user identifiers that are associated with each user attribute and a maximum count threshold for user identifiers that are associated with each user attribute.

20. The grouping system of claim 15, wherein the success event count for each user attribute is a count of click events for user identifiers that are associated with such user attribute.

21. The system of claim 15, wherein the success event count for each user attribute is a count of conversion events for user identifiers that are associated with such user attribute.

22. The system of claim 15, wherein the grouping processor and/or memory are configured for stopping the clustering based on an evaluation metric of the clustering with respect to a golden set of the user identifiers that are known to belong to similar users.

23. The system of claim 15, wherein the grouping processor and/or memory are configured for sending a query via the interface to the processor nodes for repeating the clustering based on a different evaluation metric.

24. The system of claim 15, wherein the grouping processor and/or memory are further configured for
for each user attribute, counting a different type of success event for a user action that has occurred for a plurality of user identifiers that are each associated with such user attribute to obtain a different type of success event count; and
sending a query via the interface to the processor nodes for repeating the operation of clustering based on the different type of success event count of each user attribute.

25. At least one non-transitory computer readable storage medium having computer program instructions stored thereon that are arranged to perform or initiate the following operations:
by a plurality of processor nodes of a grouping system, receiving a query and together obtaining a plurality of user data sets associated with a plurality of user identifiers for a plurality of anonymous users, wherein each user data set of each user identifier specifies one or more user attributes and on-line user events that have occurred for such user identifier, wherein the on-line user events each comprises an exposure event for exposing a user to an on-line advertisement impression or content or a success event for a user action that is performed with respect to an advertisement impression or content;
by the plurality of processor nodes of the grouping system, counting for each user attribute the success events for a set of impressions or content and across the plurality of user data sets to obtain a success event count for each user attribute across the plurality of user data sets; and
by the plurality of processor nodes of the grouping system, clustering the plurality of user identifiers and their associated user data sets into a plurality of user groups by weighting each user attribute based on its success event count relative to other success event counts of other user attributes, wherein weighting of the user attributes affects the clustering so that user identifiers that have one or more shared attributes with higher success event counts across the plurality of user data sets are more likely to be clustered together and distinguished from user identifiers that have other shared attributes having lower success event counts across the plurality of user data sets.

* * * * *